Aug. 11, 1970

C. HANDLEY 3,523,703

MITER CORNER CONSTRUCTION

Filed March 19, 1969

INVENTOR.
CHESTER HANDLEY

BY
Emanuel R. Posnack
ATTORNEY

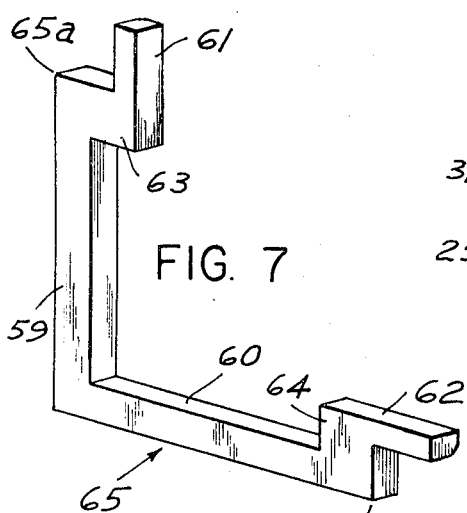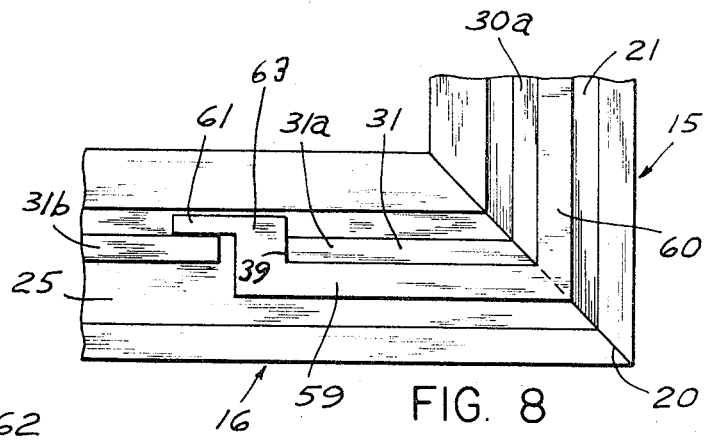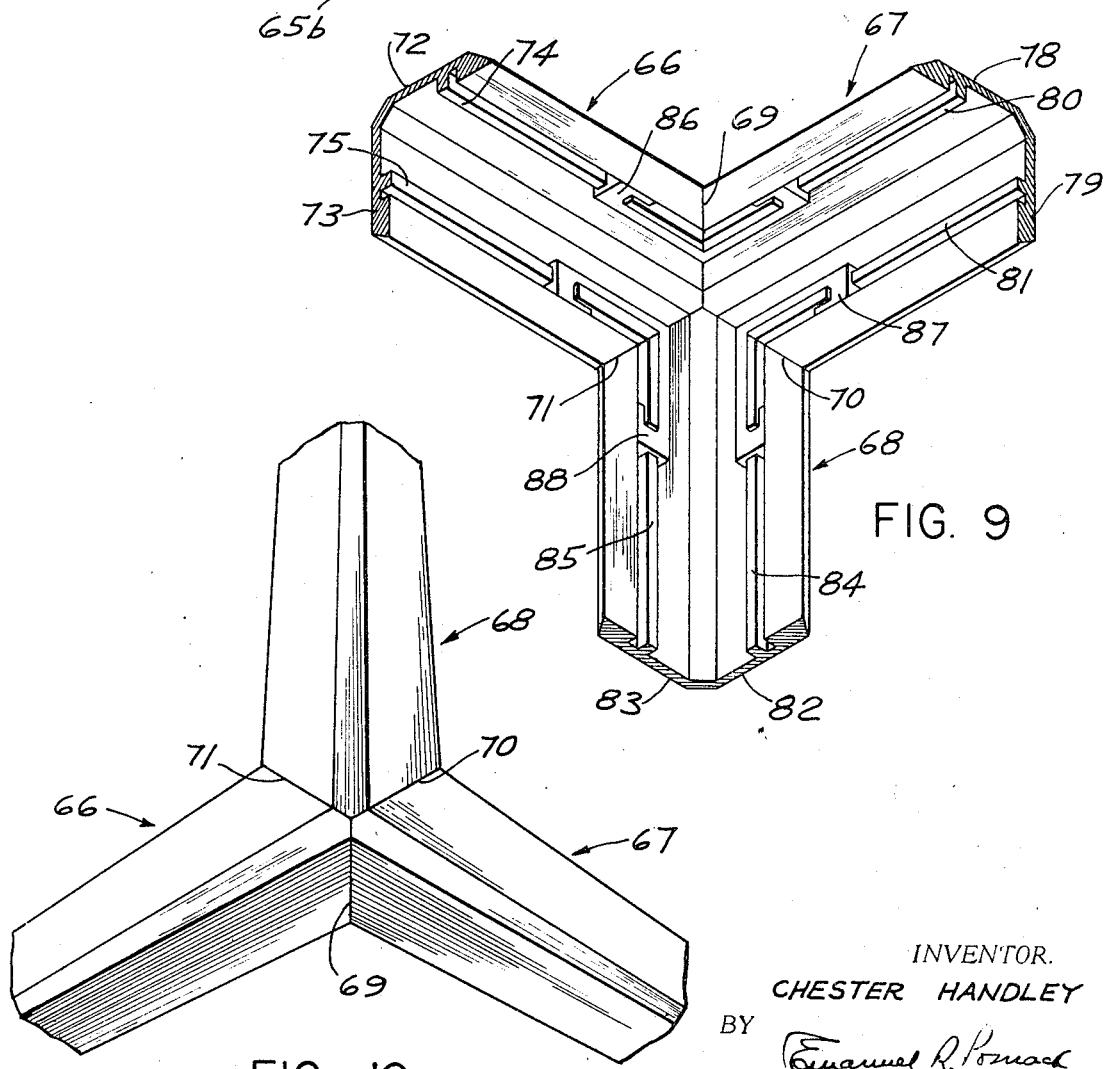

3,523,703
MITER CORNER CONSTRUCTION

Chester Handley, Morristown, N.J., assignor to Sternco Industries, Inc., Harrison, N.J., a corporation of New Jersey
Filed Mar. 19, 1969, Ser. No. 808,453
Int. Cl. F16b 3/00
U.S. Cl. 287—189.36                13 Claims

ABSTRACT OF THE DISCLOSURE

A miter corner construction for aquarium tanks or other multi-panelled enclosures comprising one or more connector clips positioned within two or more adjacent coacting frame members with mutually engaged miter surfaces and arranged to hold said surfaces together in matched and locked relation. The clip comprises two arms in angular relation the terminals of each having an offset aligning finger connected to the arm by a short transverse push bar. Said frame members are each longitudinally recessed to form a cavity within which is disposed a longitudinal rib. The clip is positioned with its two arms disposed within the respective cavities of two adjacent frame members, each of said transverse push bars being in pressing engagement with a transverse portion of the corresponding rib, thereby transmitting pressure longitudinally through said rib to the engaged miter surfaces of the frame members to keep them pressed together. The said aligning fingers and their corresponding arms flank the opposite faces of the adjacent rib, so that each rib, and consequently each frame, is tightly held against transverse movement, whereby the components of the engaged mitered joint are maintained in perfectly matched relation, so as to keep the panels of the tank or enclosure in proper mated relation.

FIELD OF THE INVENTION

This invention relates to miter corner constructions, and is especially, although not exclusively, directed to devices of this category adapted for use with home aquarium tanks.

BACKGROUND OF THE INVENTION

The known art

It is generally recognized that in multi-panelled enclosures, especially in four-walled constructions where the upper edges and corners are provided with mated frame members, there must be an exact matching of the contacting ends of the frame members to enable the previously fabricated walls of the enclosure to be in proper assembled relation. Without such perfect matching both the frame members and the said walls will not be in proper predetermined relation. This not only results in a distorted and unattractive structure but in water-containing tanks such as home aquariums the adjacent edges of the glass aquarium walls will not be in optimum sealing relation for effecting water-tight joints.

In attempts to meet the above-mentioned requirements various expedients have been employed. Most of these have been directed towards the end of obtaining tightly mitered joints of the peripheral frame structure; but with many of these devices the very forces induced in the frame members to bring them into pressing engagement often cause a mutual slipping of the contacting bevelled surfaces, so that the tightly engaged frame members are not in matched relation. In certain other conventional corner constructions of this category the matching of coacting miter surfaces of adjacent frame members may be accomplished, but often at the expense of loose joints. And in many mitered corner constructions the devices employed are costly, at times difficult to apply and in certain cases require careful machinery operations to meet the required close tolerances.

OBJECTIVES OF THE INVENTION

It is the main objective of this invention to provide mitered corner means of relatively simple construction and having none of the aforesaid shortcomings. More specifically, among the objectives of this invention are: the provision of means for enabling adjacent frame members wtih miter surfaces to be quickly and effectively joined into operative assembled relation with the engaged surfaces in pressing engagement and perfectly matched; the provision of multiple-branch frame constructions composed of two or more sections operatively assembled in tightly matched relation; the provision of means permitting the use of extruded or other readily fabricated frame members; and the provision of a simple and easily fabricated connector unit that can be quickly and easily snapped into assembled relation with two coactively adjacent frame members for simultaneously connecting them into pressing and perfectly matched relation, and for holding said frame members locked in such relation.

Other objects, features and advantages will appear from the drawings and the description hereinafter given.

SUMMARY OF THE INVENTION

In the preferred construction of this invention, a specially shaped connector clip, positioned within two mating frame members in right angle relation, draws them together and holds their miter surfaces locked in matched and pressing engagement in accordance with the objectives hereinabove stated.

Said frame members are longitudinally recessed; and integral with the respective bases of said recessed portions are longitudinal ribs whose longitudinal center lines meet at the mutually engaged miter surfaces, each rib being so formed or cut as to have a transverse wall spaced from the corner juncture of the mating frame members.

The said connector clip comprises two arms in right angle relation, the terminals of each of said arms having a short offset aligning finger extending in the general direction of the corresponding arm, each finger being connected to its arm by a short transverse bar, hereinafter sometimes referred to as a push bar. The clip is positioned within two adjacent frame members, said two arms being disposed in the cavities formed by the two respective recessed portions of said members, the preferred arrangement being such that one of said two arms engages a lateral face of one of said ribs and the other arm engages the corresponding lateral face of the other of said ribs, the said aligning fingers of said arms engaging the respective opposite faces of said respective ribs.

The lengths of said arms are such that when the clip is operatively inserted into the respective cavities of the two frame members the said transverse push bar will come into pressing engagement with the respective transverse walls of said ribs, the pressure of said bars being directly transmitted longitudinally to the coacting miter surfaces of said frame members. Since each rib is flanked by one arm and one aligning finger, said frame members, being integral with said respective ribs, cannot move transversely with respect to the clip, and can only move towards each other in matched relation, the transverse push bars holding them locked in such relation.

DESCRIPTION OF THE DRAWINGS

FIG. 7 is a perspective view of another modified connector clip of this invention.

FIG. 8 is a fragmentary plan view substantially like FIG. 2 but showing the clip of FIG. 7 operatively in place.

FIG. 9 is an inside perspective view of a miter corner construction of this invention formed by three frame members fragments of which are illustrated.

FIG. 10 is an outside perspective view of the corner construction of FIG. 9.

DESCRIPTION OF PREFERRED EMBODIMENTS

Figure 1:
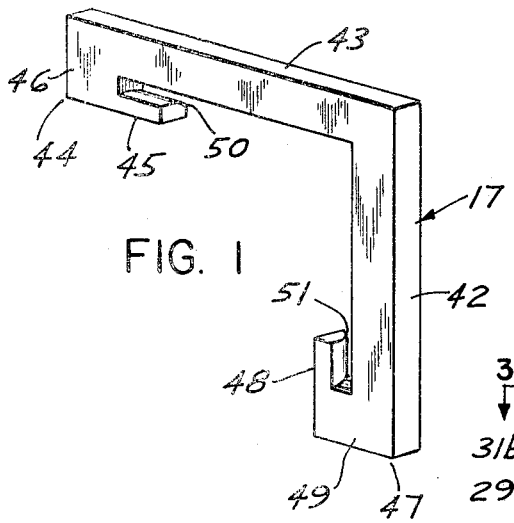
FIG. 1 is a perspective view of one form of connector clip employed in this invention.
Figure 2:
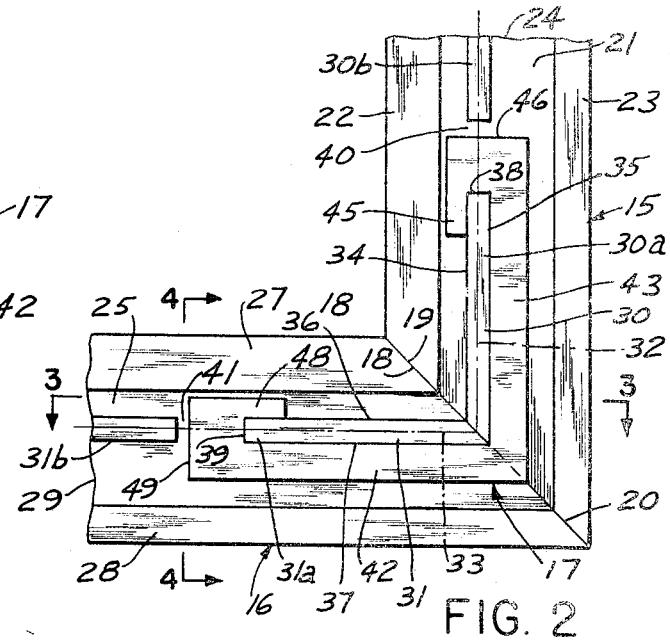
FIG. 2 is a fragmentary inside plan view of two frame members and the clip of FIG. 1 shown in assembled relation and constituting a miter corner construction according to one embodiment of this invention.
Figure 3:
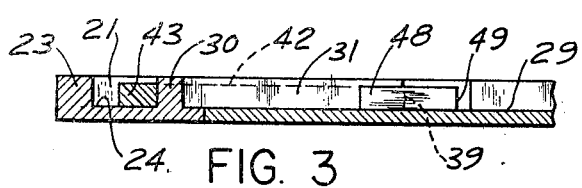
FIG. 3 is a section of FIG. 2 taken along line 3—3.
Figure 4:
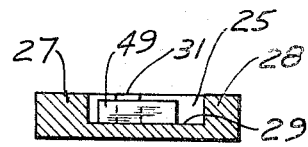
FIG. 4 is a section of FIG. 2 taken along line 4—4.
Figure 5:
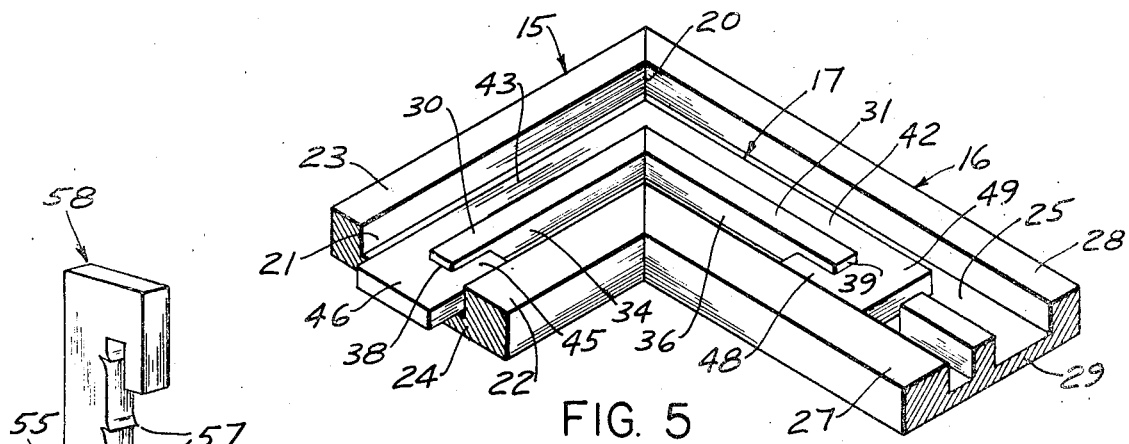
FIG. 5 is a perspective view of the construction shown in FIG. 2.

In the form of this invention illustrated in FIGS. 1 to 5, the corner construction comprises the two frame members 15 and 16 secured together by the connector clip 17. Said frame members have the respective bevelled miter surfaces 18 and 19 in mutual engagement, said surfaces being proportioned for mating at the common corner juncture 20. In the structure illustrated the said frame members 15 and 16 are in right-angle relation. Each of said frame members is longitudinally recessed, the recessed portion 21 of member 15 constituting a cavity formed by the side walls 22 and 23 and the base 24, the recessed portion 25 of member 16 constituting a cavity formed by the side walls 27 and 28 and the base 29.

Positioned within said cavities 21 and 25 and integral with the respective bases 24 and 29 thereof are the respective longitudinally extending ribs 30 and 31, said ribs being so proportioned and positioned that their respective longitudinal center lines 32 and 33 meet at the corner juncture 20—it being preferred, but not required, that the inner ends of said respective ribs engage each other at said corner juncture 20. Each rib has opposite faces spaced from the said respective side walls defining said cavities, to wit, the rib 30 has the opposite faces 34 and 35 spaced from the walls 22 and 23, respectively, and the rib 31 has the opposite faces 36 and 37 spaced from the walls 27 and 28, respectively. The said ribs 30 and 31 also have transverse walls 38 and 39, respectively, which, in the embodiments illustrated, extend between the adjacent pairs of said faces. In the particular construction shown, the frame members are formed by an extrusion process, whereby the said ribs emerge from the extruding apparatus in a continuous length, after which the ribs are slit at 40 and 41, respectively, thereby dividing the respective ribs into sections 30a, 30b and 31a, 31b, the outer ends of the respective rib sections 30a and 31a forming said respective transverse walls 38 and 39.

The said connector clip comprises two arms 42 and 43 in angular relation, the illustrated embodiment showing said arms in right angular relation. At the outer end of each of said arms and in offset relation thereto is an aligning finger whose functions will more clearly hereinafter appear. At the end of arm 43 is the hook-shaped portion 44 having the aligning finger 45 and the short transverse bar 46—at times hereinafter referred to as a push bar—connecting said latter finger to said arm 43; and at the end of the arm 42 is the hook-shaped portion 47 having the aligning finger 48 and the short transverse push bar 49 connecting finger 48 to said arm 42. It will be noted that each of said fingers is at the same side of the adjacent bar as the corresponding arm, and extends in the general direction of said arm.

In operatively assembling the above-described components of this invention, the two frame members are brought into mutual contact with their said miter surfaces 18 and 19 into engagement as illustrated; and then the connector clip 17 is slipped over said ribs 30 and 31 with the respective arms 42 and 43 of the clip positioned within the said respective cavities 25 and 21 of the corresponding frame members. It will be noted that the leading edges 50 and 51 of the respective fingers 45 and 48 are rounded, thereby facilitating the entry of the clip into the said cavities. Clip 17 is so proportioned that the rib 31 will be flanked by the arm 42 and finger 48, and the rib 30 will be flanked by the arm 43 and the finger 45—the transverse bar 49 being in pressing engagement with the said transverse wall 39 of rib 31 and the transverse bar 46 being in pressing engagement with said transverse wall 38 of rib 30.

The arrangement is hence such that both transverse push bars 46 and 49 transmit longitudinally directed pressures through the respective ribs 30 and 31 towards the miter surfaces 18 and 19 of the respective frames, locking them together. The said flanking elements 42, 48 and 43, 46—that is, the coacting arms and aligning fingers—prevent transverse movements of the respective ribs, each finger cooperating with the coacting arm to hold the corresponding frame in proper longitudinal alignment. The two frames 15 and 16 are thus correctly aligned longitudinally and properly mated at their common corner juncture 20. It is preferred that the opposite faces of each of said ribs 30 and 31 be in firm engagement with both the flanking arm and finger, so as to positively prevent transverse displacement of the frame members in any direction. It has been found, however, that satisfactory results are obtainable with only one of the flanking elements in firm engagement with the adjacent rib face provided the opposite element is close to the opposite rib face.

Figure 6:
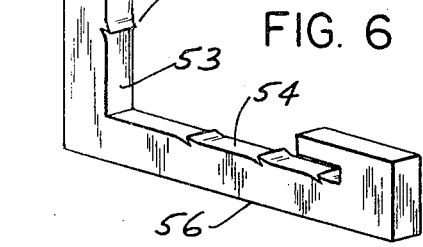
FIG. 6 is a perspective view of a modified form of connector clip of this invention.

The connector clip 58 of FIG. 6 is substantially like that of FIG. 1, except that the inner walls 53 and 54 of the respective arms 55 and 56 contain a plurality of serrations or gripping elements 57 adapted to prevent relative longitudinal movement between the clip and the ribs 30 and 31 when said inner walls 53 and 54 are in operative engagement with the adjacent faces of the corresponding ribs.

The connector clip 65 of FIGS. 7 and 8 has the two arms 59 and 60 with the offset aligning fingers 61 and 62, respectively, connected to said arms by the respective transverse push bars 63 and 64. This embodiment is thus distinguishable from that of FIG. 1 in that the arms 59 and 60 of clip 65 have at their ends jog-shaped portions 65a and 65b, whereas the arms 42 and 43 of clip 17 have at their respective ends the hook-shaped portions 47 and 44.

When the connector clip 65 is operatively positioned within said mating frame members 15 and 16, the arms 59 and 60 are disposed within the respective cavities 25 and 21 in the manner aforesaid; but the offset aligning fingers 61 and 62 are in engagement with sections of the ribs more remote from the corner 20 than the corresponding fingers of the hook-shaped end portions of the connector clip 17. This is because said fingers 61 and 62 and their corresponding arms 59 and 60 are on opposite sides of their respective transverse bars 63 and 64. Thus, by referring to FIG. 8, it will be seen that finger 61 is in engagement with the section 31b of the rib 31 rather than section 31a thereof, a similar arrangement (not shown)

being present at the opposite end of the clip 65. This modification thus provides operative engagement of the pairs of flanking elements 59, 61 and 60, 62 with the corresponding ribs along greater longitudinal distances from said corner juncture 20, providing corresponding greater resistance against transverse displacement of the frames.

FIGS. 9 and 10 illustrate the application of this invention to corner constructions having three frame members meeting at miter surfaces, a construction to be found in aquarium tanks having upper horizontal peripheral frame members and vertical corner frame members. The frame members 66, 67 and 68 meet at suitably bevelled miter surfaces well known to those skilled in the art and therefore not described herein. Suffice it to say for the purpose of this specification that junctures 69, 70 and 71 are formed by the mating engagement of the ends of said three frame members. Each frame member is formed of two walls in right-angle relation, each wall having a longitudinal rib, the ribs being in parallel relation. Specifically, frame member 66 has the walls 72 and 73 and the respective parallel ribs 74 and 75; frame member 67 has the walls 78 and 79 and the respective parallel ribs 80 and 81; and frame member 68 has the walls 82 and 83 and the respective parallel ribs 84 and 85.

Three connector clips 86, 87 and 88, like clip 17 of FIG. 1, are employed in this construction, each clip having its two arms and aligning fingers in operative relation to two corresponding ribs of two mating frame members in the manner above described. Clip 86 is in operative engagement with the ribs 74 and 80 of the respective frame members 66 and 67; clip 87 is in operative engagement with the ribs 81 and 84 of the respective frame members 67 and 68; and clip 88 is in operative engagement with the ribs 85 and 75 of the respective frame members 68 and 66. The arrangement is hence such that the three frame members are held in tightly mated relation by the three said clips—frame members 66 and 67 by the clip 86, frame members 67 and 68 by the clip 87, and frame members 68 and 66 by the clip 88. This miter corner construction thus has properly and securely squared frame members whereby an enclosure, such as an aquarium tank, provided with such construction can be assured of having prefabricated walls positioned in proper mutual relation.

In the above description, the invention has been disclosed merely by way of example and in preferred manner; but obviously many variations and modifications may be made theerin. It is to be understood, therefore, that the invention is not limited to any particular form or manner of practicing same.

I claim:

1. A miter corner construction having two frame members and a coacting connector clip, said frame members being in angular relation and operatively mated at adjacent miter surfaces and each having a longitudinally extending rib with two laterally opposite faces and a transverse wall spaced from said miter surfaces, said connector clip comprising two arms in angular relation corresponding to the angular relation of said frame members, each of said arms having at the outer end thereof an offset aligning finger and a transverse bar connecting said finger to said arm, said finger extending in the general longitudinal direction of the arm, each of said ribs having its said transverse wall positioned adjacent the corresponding transverse bar and being fllanked by the adjacent arm and aligning finger, at least one of said faces of each rib being engaged by one of said flanking elements, thereby to limit transverse movements of said frame members.

2. A miter corner construction having two frame members and a coacting connector clip, said frame members being in angular relation and operatively mated at adjacent miter surfaces and each having a longitudinally extending rib with two laterally opposite faces and a transverse wall spaced from said miter surfaces, said connector clip comprising two arms in angular relation corresponding to the angular relation of said frame members, each of said arms having at the outer end thereof an offset aligning finger and a transverse push bar connecting said finger to said arm, each of said ribs being flanked by the adjacent arm and aligning finger, said transverse push bar of each of said arms being in pressing engagement with the said transverse wall of the adjacent rib, whereby pressure is transmitted longitudinally through both of said ribs towards said miter surfaces to keep them in mutual pressing engagement.

3. A miter corner construction according to claim 1, said transverse bars of said respective arms being in pressing engagement with the said adjacent transverse walls of said respective ribs, whereby pressure is transmitted longitudinally through both of said ribs towards said miter surfaces to keep them in mutual pressing engagement.

4. A miter corner construction according to claim 3, said frame members having longitudinally recessed portions defined by a base and opposite side walls, said ribs extending up from said respective bases and being in spaced relation to said side walls, said arms of the connector clip being disposed within said respective recessed portions.

5. A miter corner construction according to claim 3, the longitudinal center lines of said respective ribs meeting at said mated miter surfaces of said frame members.

6. A miter corner construction according to claim 3, each of said arms and the corresponding aligning fingers being in engagement with the said opposite faces of the adjacent ribs, whereby said respective ribs and the corresponding frame members will be held against transverse movement with respect to said respective arms, thereby to prevent lateral movement of said miter surfaces.

7. A miter corner construction according to claim 6, the end of each of said arms having a substantially hook-shaped portion, the said aligning finger being bent toward said mating miter surfaces.

8. A miter corner construction according to claim 6, the end of each of said arms having a jog-shaped portion, the said aligning finger being bent away from said mating miter surfaces.

9. A miter corner construction according to claim 3, each of said ribs having in an intermediate portion thereof a transverse slit defined by two transverse walls, said transverse bar of each of said arms extending through the adjacent slit and being in operative pressing engagement with the transverse wall thereof closer to said miter surfaces.

10. A miter corner construction having three frame members and three coacting connector clips, said frame members being in mutual right angular relation and operatively mated at adjacent miter surfaces, each of said frame members having two spaced parallel longitudinally extending ribs each with two laterally opposite faces and a transverse wall spaced from said miter surfaces, the two corresponding ribs of each pair of adjacent frame members meeting at the respective mated surfaces, thereby forming three right angular rib sections, each of said connector clips comprising two arms in right angular relation, each of said arms having at the outer end thereof an offset aligning finger and a transverse bar connecting said finger to said arm, each of said clips being positioned in adjacent coactive relation to one of said right angular rib sections, the said transverse bar of each arm being in pressing engagement with the adjacent transverse wall of the corresponding rib, each of said ribs being flanked by the adjacent arm and aligning finger.

11. A connector clip for use in a miter corner construction having two operatively mated frame members, comprising two arms in angular relation, each of said arms having at the outer end thereof an offset finger and a transverse bar connecting said finger to the corresponding arm, said finger extending in the general longitudinal direction of the arm.

12. A connector clip according to claim 11, the outer end of each of said arms having a substantially hook-shaped portion, said finger being bent back so that it is at the same side of said transverse bar as the arm.

13. A connector clip according to claim 11, the end of each arm having a substantially jog-shaped portion, the said finger and said arm being at opposite sides of said transverse bar.

References Cited

UNITED STATES PATENTS

| | | |
|---|---|---|
| 2,703,155 | 3/1955 | Van Fleet. |
| 2,792,918 | 5/1957 | Olsen. |
| 2,904,360 | 9/1959 | Gamlen. |
| 3,144,265 | 8/1964 | Humble. |
| 3,162,282 | 12/1964 | Mendelsohn. |
| 3,200,913 | 8/1965 | Nelson. |
| 3,474,749 | 3/1969 | Meyer. |

FOREIGN PATENTS

| | | |
|---|---|---|
| 743,332 | 1/1956 | Great Britain. |

REINALDO P. MACHADO, Primary Examiner

W. L. SHEDD, Assistant Examiner

U.S. Cl. X.R.

52—585; 287—54